(No Model.)
J. MANNING.
ANIMAL TRAP.
No. 496,164. Patented Apr. 25, 1893.
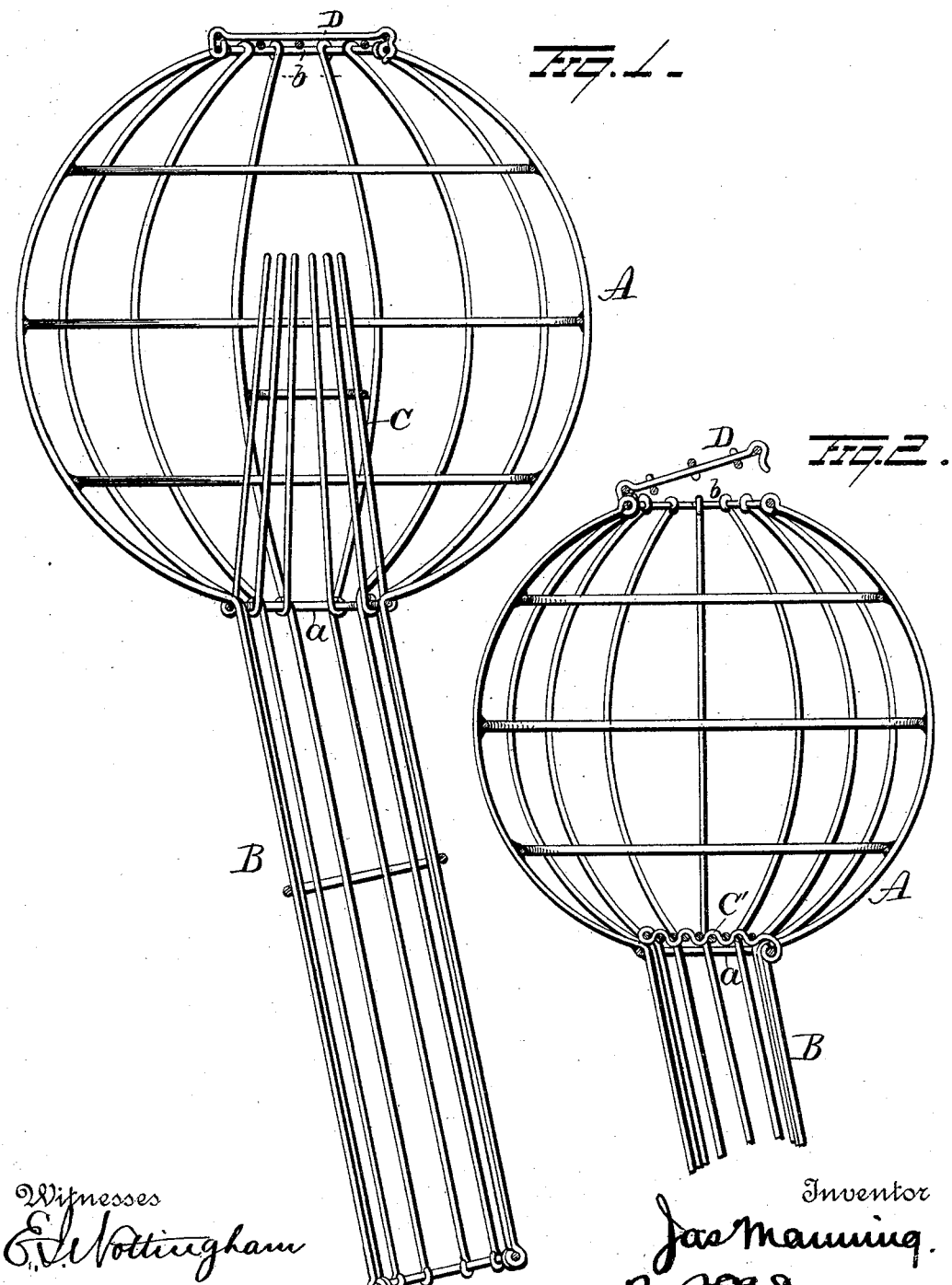

UNITED STATES PATENT OFFICE.

JAMES MANNING, OF WATER VALLEY, TEXAS.

ANIMAL-TRAP.

SPECIFICATION forming part of Letters Patent No. 496,164, dated April 25, 1893.

Application filed July 13, 1892. Serial No. 439,914. (No model.)

*To all whom it may concern:*

Be it known that I, JAMES MANNING, a citizen of Water Valley, in the county of Tom Green and State of Texas, have invented certain new and useful Improvements in Animal-Traps; and I do hereby declare the following to be a full, clear, and exact description of the invention, such as will enable others skilled in the art to which it appertains to make and use the same.

My invention relates to an improvement in animal traps, and more particularly to such as are employed for catching animals which live or burrow in the ground.

A further object is to produce a trap for catching prairie dogs and other similar animals, and to so construct and arrange the trap that the animal will be entrapped as it leaves its den or hole and without any liability of the animal escaping by boring around or through the trap.

With these objects in view the invention consists in certain novel features of construction and combinations and arrangements of parts as hereinafter set forth and pointed out in the claims.

In Figure 1 of the accompanying drawings is represented my improved trap. Fig. 2 is a view of a modification.

A represents a spherical cage, which may be made of wire, wire netting or other suitable material, and is made with diametrically opposite openings *a*, *b*. Communicating with the opening *a* and projecting from the cage A, preferably at an angle, is a barrel B made of wire or other suitable material, said barrel B being adapted to be inserted in the den or hole in which the animal to be caught lives. The barrel B terminates at its upper end in a funnel C, made of the same material as the barrel, said funnel projecting into the cage A. The opening *b* is covered by a door D, and through this opening the animal may be removed from the trap.

To use the trap, the barrel B is inserted in the hole or den bored by the animal, the cage A resting on the surface of the ground. The barrel B will prevent the animal from scratching or burrowing out on the side of the trap, he being forced to continue into the cage or pen A, from which escape is impossible.

The size of the trap is to be made suitable to the size of the animal to be caught,—that is to say, the barrel B should be just large enough to fit the hole in which the animal is found.

Instead of the funnel C, a trap door C', may be employed, as shown in Fig. 2.

Slight changes might be made in the details of construction of the device without departing from the spirit of my invention or limiting its scope, hence I do not wish to limit myself to the precise details of construction herein set forth, but, Having fully described my invention, what I claim as new, and desire to secure by Letters Patent, is—

1. As an article of manufacture, an animal trap comprising a cylindrical barrel portion constructed to enter and fill the hole through which the animal to be caught passes, an enlarged portion, and a cone or funnel projecting from the cylinder into the enlarged portion of the trap, substantially as set forth.

2. As an article of manufacture an animal trap, comprising a cylindrical barrel adapted to enter and fill the hole through which the animal to be caught passes, a funnel or cone extending outward from the outer end of the barrel, a spherical cage into which the funnel leads, said cage having an opening therein large enough for the animal to pass through, and a door for this opening, substantially as set forth.

In testimony whereof I have signed this specification in the presence of two subscribing witnesses.

JAS. MANNING.

Witnesses:
M. V. SHARP,
W. C. MILLER.